(12) United States Patent
Okada

(10) Patent No.: US 6,891,975 B2
(45) Date of Patent: May 10, 2005

(54) IMAGE ENCODING DEVICE, IMAGE DECODING DEVICE, ELECTRONIC CAMERA AND RECORDING MEDIUM

(75) Inventor: Sadami Okada, Sakado (JP)

(73) Assignee: Nikon Corporation, Tokyo (JP)

( * ) Notice: Subject to any disclaimer, the term of this patent is extended or adjusted under 35 U.S.C. 154(b) by 690 days.

(21) Appl. No.: 10/024,279

(22) Filed: Dec. 21, 2001

(65) Prior Publication Data

US 2002/0081036 A1 Jun. 27, 2002

(30) Foreign Application Priority Data

Dec. 22, 2000 (JP) ........................................ 2000-390837

(51) Int. Cl.⁷ ................................................ G06K 9/36
(52) U.S. Cl. ...................................................... 382/243
(58) Field of Search ................................ 382/232–233, 382/236, 238–240, 243, 248–252; 375/240.03, 240.04, 240.05, 240.11, 240.16, 240.18, 240.19, 240.25; 348/384.1, 394.1, 395.1, 403.1, 404.1, 408.1, 424.2

(56) References Cited

U.S. PATENT DOCUMENTS

| | | | | | |
|---|---|---|---|---|---|
| 5,333,012 | A | * | 7/1994 | Singhal et al. | 375/240.04 |
| 5,802,213 | A | * | 9/1998 | Gardos | 382/239 |
| 5,835,149 | A | * | 11/1998 | Astle | 375/240.05 |
| 5,995,668 | A | * | 11/1999 | Corset et al. | 382/233 |
| 6,128,344 | A | * | 10/2000 | Aono et al. | 375/240.11 |
| 6,351,491 | B1 | * | 2/2002 | Lee et al. | 375/240.03 |
| 6,697,529 | B2 | * | 2/2004 | Kuniba | 382/239 |

FOREIGN PATENT DOCUMENTS

| | | |
|---|---|---|
| JP | 05-307537 | 11/1993 |
| JP | 10-177652 | 6/1998 |

OTHER PUBLICATIONS

Hideyuki Tamura, "Computer Image Processing", Aug. 1985, Tokyo, Japan, Sokenshuppan publisher, Pages 123, 25 and 126.

Morio Onue, "Handbook for Image Processing", Jun. 1987, Tokyo, Japan, Shoukodo publisher, Pages 318, 321.

* cited by examiner

Primary Examiner—Jose L. Couso
(74) Attorney, Agent, or Firm—Morgan, Lewis & Bockius LLP

(57) ABSTRACT

An image encoding device equipped with a transformation component which transforms given image data into transformation coefficients by subjecting this image data to a frequency decomposition, a dividing component which divides the transformation coefficients produced by the transformation component into a selected region on the image and a non-selected region other than the selected region, and an encoding component which encodes the transformation coefficients by preferentially allocating a greater quantity of information to the selected region than to the non-selected region, and the dividing component performs an equation evaluation of numerical equation data that stipulates the boundary of the selected region, and determines whether the transformation coefficients belong to the selected region on the basis of the results of this equation evaluation, to perform the division into a selected region and non-selected region during image encoding with less processing.

17 Claims, 10 Drawing Sheets

A

B

C

D

IMAGE ENCODING DEVICE, IMAGE DECODING DEVICE, ELECTRONIC CAMERA AND RECORDING MEDIUM

The present invention claims the benefit of Japanese Patent Application No. 2000-390837 filed in Japan on Dec. 22, 2000, which is hereby incorporated by reference.

BACKGROUND OF THE INVENTION

The present invention relates to an image encoding device, and more particularly to an image encoding device which encodes image data, an image encoding program and a recording medium for the same. The present invention also relates to an image decoding device which decodes a compressed image file, an image decoding program, and a recording medium for the same, and an electronic camera which is equipped with an image encoding device.

DISCUSSION OF THE RELATED ART

Encoding algorithms and encoding processing is known in the art. For example the JPEG2000 encoding algorithm and encoding processing is an encoding procedure that includes: Color Coordinate Transformation, Wavelet Transformation, Quantization, Bit Modeling, ROI (Region of Interest) function, and Arithmetical Encoding of the Bit Stream Formation to form a compressed image file.

In the Color Coordinate Transformation the input image is subjected to a color coordinate transformation as required.

In the Wavelet Transformation the image is subjected to discrete wavelet transformation in the vertical and horizontal directions, and is divided into a plurality of sub-bands (LL, LH, HL, HH). Among these, the LL band of the lowest frequency region is repeatedly subjected to decomposing wavelet transformation in a recursive manner.

In the Quantization the wavelet transformation coefficients are quantified by each sub-band. Furthermore, in unifying processing, the Quantization step is always set at "1." Here, in the case of compression, the lower N bit planes are discarded in an after-process. This discarding processing is equivalent to a Quantization step "2 to the power of N."

In the Bit Modeling, following Quantization, the wavelet transformation coefficients are divided into encoding blocks of a fixed size (e.g., 64×64) within each sub-band. After the transformation coefficients within each encoding block are divided into sign bits and absolute values, the absolute values are distributed among a natural binary number of bit planes. The bit planes thus constructed are encoded in order from the upper bit plane via three types of encoding passes (significance pass, refinement pass and cleanup pass). Furthermore, the sign bits are encoded immediately after the uppermost bits of the corresponding absolute values have appeared on the bit plane.

In a ROI (Region of Interest) encoding function, a greater quantity of information is preferentially allocated to a selected region on the image, so that the decoded image quality of the selected region is improved. In concrete terms, the transformation coefficients (following Quantization) that are positioned in the selected region are shifted upward by S bits, and are then subjected to the above-mentioned bit modeling. As a result, the selected region is shifted to the upper bit planes, and is encoded with a higher priority than any bit of the non-selected region.

Furthermore, in the max shift method, the bit shift number S is set so that it is larger than the place number of the uppermost bit in the non-selected region. Accordingly, the non-zero transformation coefficients of the selected region always have a value of "2 to the S power" or greater. Consequently, during decoding, the transformation coefficients of the selected region can easily be reproduced by selectively shifting quantified values of "2 to the S power" or greater downward.

In the Arithmetical Encoding of the Bit Stream Formation the SNR progressive and space resolution progressive, etc., are realized by arranging the data of the respective encoding blocks according to combinations of four axes (importance of bit plane, space resolution, block position and color components).

For example, in the case of SNR progressive, the respective encoding blocks are split for each encoding pass, and the split data is classified according to degree of contribution to the improvement of SNR, so that a plurality of layers are constructed. An SNR progressive bit stream is formed by lining these layers up in order from the top. Fixed-length compression can be realized by cutting this bit stream using an appropriate file size.

Furthermore, more detailed and accurate international standards can be ascertained via ISO, ITU-T and other standards organizations.

In the JPEG2000, a division into a selected region and a non-selected region is ordinarily performed using a mask image of a binary bit map. As the numbers of vertical and horizontal pixels of the image increase, the quantity of data in this mask image increases. As a result, the following problem arises: in the ROI processing system, the mask image with a variable quantity of data must be handled by buffering, so the implementation of the ROI processing system becomes complicated.

Furthermore, each time that the numbers of vertical and horizontal pixels of the image are varied, a mask image must be newly prepared, which results in a heavy processing burden.

Moreover, since the mask image has a large quantity of data, the burden of transferring the mask image to the ROI processing system and the burden of storing the mask image as data also are heavy.

Furthermore, in the wavelet transformation, the numbers of vertical and horizontal samples of the transformation coefficients vary according to the sub-band split region. Accordingly, the mask image must be enlarged or reduced in accordance with each sub-band split region, so that the burden of calculating the resolution conversion also is heavy.

SUMMARY OF THE INVENTION

Accordingly, the present invention is directed to an image encoding device, electronic camera and recording medium that substantially obviates one or more of the problems due to limitations and disadvantages of the related art.

An object of the present invention is to accomplish the division into the selected region and non-selected region that is performed at the time of image encoding with a smaller processing burden.

Another object of the present invention is to determine the selected region with appropriate matching to the image at the time of image encoding.

Furthermore, another object of the present invention is to accomplish the division into the selected region and non-selected region that is performed at the time of image decoding with a smaller processing burden.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve this and other advantages and in accordance with the purpose of the present invention, as embodied and broadly described the image encoding device, electronic camera and recording medium is equipped with a transformation component which transforms given image data into transformation coefficients by subjecting this image data to a frequency decomposition, a dividing component which divides the transformation coefficients produced by the transformation component into a "selected region on the image" and a "non-selected region other than the selected region," and an encoding component which encodes the transformation coefficients by preferentially allocating a greater quantity of information to the selected region than to the non-selected region, and the dividing component performs an equation evaluation of numerical equation data that stipulates the boundary of the selected region, and determines whether the transformation coefficients belong to the selected region on the basis of the results of this equation evaluation.

In another aspect of the invention in the image encoding device the dividing component is equipped with a numerical equation preparation component which performs an edge detection for the image data, determines an outline on the basis of the results of this edge detection, and prepares numerical equation data that approximately expresses the outline, and an equation evaluation component which performs an equation evaluation of the above-mentioned numerical equation data prepared by the above-mentioned numerical equation preparation component, and which makes a judgement on the basis of the equation evaluation results as to whether the transformation coefficients belong to the selected region.

In another aspect of the invention in the image encoding device the dividing component is equipped with a numerical equation preparation component which performs a color boundary detection for the image data, determines an outline on the basis of the results of this color boundary detection, and prepares numerical equation data that approximately expresses the outline, and an equation evaluation component which performs an equation evaluation of the above-mentioned numerical equation data prepared by the above-mentioned numerical equation preparation component, and which makes a judgement on the basis of the equation evaluation results as to whether the transformation coefficients belong to the selected region.

In another aspect of the invention in the image encoding device the dividing component is equipped with a numerical equation preparation component which performs a space frequency component detection for the image data, determines an outline on the basis of the results of this space frequency component detection, and prepares numerical equation data that approximately expresses the outline, and an equation evaluation component which performs an equation evaluation of the above-mentioned numerical equation data prepared by the above-mentioned numerical equation preparation component, and which makes a judgement on the basis of the equation evaluation results as to whether the transformation coefficients belong to the selected region.

In another aspect of the invention in the image encoding device the encoding component forms a compressed image file from the combined encoded transformation coefficients and the numerical equation data used by the dividing component.

In another aspect of the invention, an image decoding device decodes the compressed image file compressed by the image encoding device. This image decoding device being equipped with a decoding component which reads out the encoded transformation coefficients from the compressed image file and decodes these transformation coefficients, re-dividing component which reads out the numerical equation data from the compressed image file, performs an equation evaluation, and makes a judgement on the basis of the results of this equation evaluation as to whether the transformation coefficients decoded by the decoding component belong to the selected region, an adjustment component which adjusts the form of expression of the transformation coefficients in the selected region and the form of expression of the transformation coefficients in the non-selected region in accordance with the division of the re-dividing component, and a reverse transformation component which performs a reverse transformation on the image data using the transformation coefficients whose forms of expression have been adjusted by the adjustment component as sub-band components.

In another aspect of the invention an electronic camera is equipped with an image encoding device, and an imaging component which produces image data by imaging an object of imaging and which sends the image data thus produced to the image encoding device. This imaging encoding device comprises a transformation component which transforms given image data into transformation coefficients by subjecting this data to a frequency decomposition, a dividing component which divides the transformation coefficients produced by the transformation component into a selected region on the image and a non-selected region other than the selected region, and an encoding component which encodes the transformation coefficients by preferentially allocating a greater quantity of information to the selected region than to the non-selected region. The dividing component performs an equation evaluation of numerical equation data that stipulates the boundary of the selected region, and determines whether the transformation coefficients belong to the selected region on the basis of the results of the equation evaluation.

In another aspect of the invention an image encoding program which is used to cause a computer to function as the transformation component, dividing component and encoding component described above, is recorded on a recording medium.

In another aspect of the invention an image decoding program which is used to cause a computer to function as the decoding component, re-dividing component, adjustment component and reverse transformation component described above, is recorded on a recording medium.

In a first embodiment of the present invention, numerical equation data that stipulates the boundaries of the selected region is subjected to an equation evaluation, and a judgement is made as to whether the transformation coefficients belong to the selected regions. As a result several advantages are obtained. The quantity of the numerical equation data does not vary even if the numbers of vertical and horizontal pixels of the image increase. Accordingly, in the ROI processing system, it is necessary only to handle numerical equation data in which the quantity of data is substantially fixed, so that the implementation of the ROI processing system can be simplified compared to conventional examples in which a mask image in which the quantity of data varies is handled by buffering. Numerical equation data can also be quickly applied to images in which the numbers of vertical and horizontal pixels differ by performing a simple coordinate transformation. Accordingly, since the trouble of preparing a mask image, etc. each time that the numbers of vertical and horizontal pixels of the image change is eliminated, the processing burden is correspondingly reduced compared to conventional examples. The quantity of numerical equation data is generally smaller than the quantity of data in a mask image. Accordingly, the burden of data holding in the ROI processing system can be reduced compared to conventional examples in which a mask image is handled. Furthermore, the burden of transmitting data to the ROI processing system can also be reduced.

Furthermore, as a result of the present invention numerical equation data can be applied to a plurality of sub-band split regions by performing a simple coordinate transformation. Accordingly, in the present invention, the trouble of converting the resolution of the mask image in accordance with the number of samples, which occurs in conventional examples, does not arise. In the present invention, as a result of a synergistic effect of these advantages, the processing burden of the division into the selected region and non-selected region that is performed during encoding of the image can be appropriately reduced.

In a second embodiment of the present invention, numerical equation data is prepared on the basis of edge detection of the image. Accordingly, a main object of imaging with sharp edges can be found in an image, and a selected region can be appropriately set along the edges of this main object of imaging.

In a third embodiment of the present invention, numerical equation data is prepared on the basis of detection of the color boundaries of an image. Accordingly, a main object of imaging with sharp color boundaries can be found in an image, and a selected region can be appropriately set along the color boundaries of this main object of imaging.

In a fourth embodiment of the present invention, numerical equation data is prepared on the basis of the detection of the space frequency components of an image. Accordingly, a main object of imaging with specific space frequency components can be found in an image, and a selected region can be appropriately set along the main object of imaging.

In a fifth embodiment of the present invention of the image encoding device the numerical equation data used by the dividing component is contained in the compressed image file. The quantity of this numerical equation data is generally smaller than the quantity of data in a mask image. Accordingly, the capacity of the compressed image file can be reduced compared to a case in which a mask image is contained in the compressed image file.

Meanwhile, in the image decoding device of another embodiment, the division into the selected region and non-selected region is performed using numerical equation data in the file. In this case, the determination of the selected region can be accurately performed under the same conditions as in the image encoding device.

The electronic camera of the present invention is equipped with the image encoding device described in any of the previous embodiments. Accordingly, the processing time required for division into the selected region and non-selected region during encoding of the image can be appropriately reduced. As a result, the image processing time inside the electronic camera can be shortened compared to that required in conventional examples, so that an electronic camera that is easier to use can be realized.

The image encoding device of any of the described embodiments can be realized by using a computer to execute an image encoding program or an image decoding program.

It is to be understood that both the foregoing general description and the following detailed description are exemplary and explanatory and are intended to provide further explanations of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 8-1 through 8-9 are diagrams which illustrate the division of the boundary line into sections;

DETAILED DESCRIPTION OF THE INVENTION

Reference will now be made in detail to the preferred embodiments of the present invention, examples of which are illustrated in the accompanying drawings.

Figure 1:
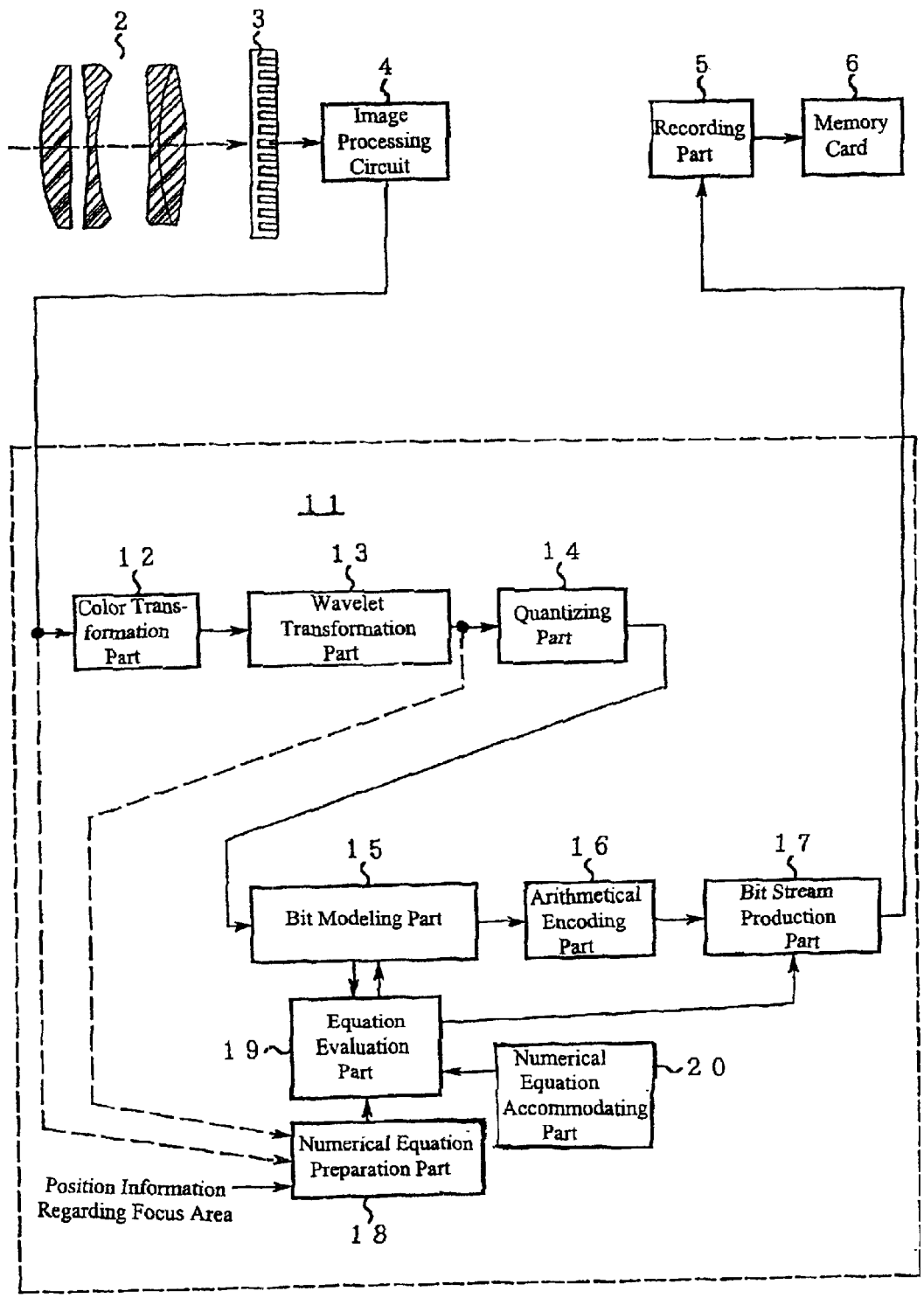
FIG. 1 is a block diagram which illustrates the construction of the electronic camera 1 and image encoding device 11.

FIG. 1 is a block diagram which illustrates the construction of the electronic camera 1 and image encoding device 11. In FIG. 1, an imaging lens 2 is mounted in the electronic camera 1. The light-receiving plane of an imaging element 3 is disposed in the image space of this imaging lens 2. The image data produced by the imaging element 3 is subjected to A/D conversion and color interpolation processing, etc., via an image processing circuit 4, and is then sent to the image encoding device 11. The compressed image file output from this image encoding device 11 is sent to a recording part 5. The recording part 5 records this compressed image file on a memory card 6.

Next, the internal construction of the above-mentioned image encoding device 11 will be described. The image data input into the image encoding device 11 is converted into a compressed image file via a color transformation part 12, a wavelet transformation part 13, a quantifying part 14, a bit modeling part 15, an arithmetical encoding part 16 and a bit stream production part 17.

Furthermore, a numerical equation preparation part 18, an equation evaluation part 19 and a numerical equation accommodating part 20 are installed in the image encoding device 11. Image data, wavelet transformation coefficients and the focus area, etc., are input into this numerical equation preparation part 18. The equation evaluation part 19 acquires numerical equation data from the numerical equation preparation part 18 or numerical equation accommodating part 20, and performs an equation evaluation of this numerical equation data. The bit modeling part 15 performs bit shift processing of the selected region on the basis of the equation evaluation results of the equation evaluation part 19. Furthermore, in cases where a method other than the max shift method is used, the equation evaluation part 19 sends the numerical equation data used to designate the selected region to a bit stream production part 17.

Figure 2:
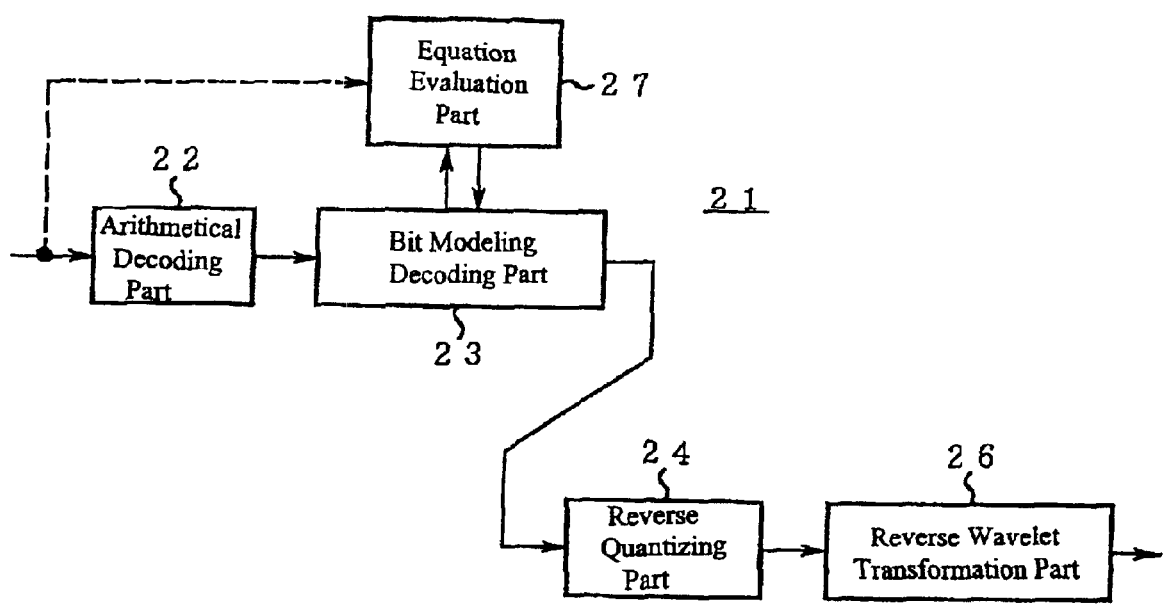
FIG. 2 is a block diagram of the image decoding device 21.

FIG. 2 is a block diagram of the image decoding device 21 used to decode the compressed image file prepared by the above-mentioned image encoding device 11. In FIG. 2, the compressed image file that is input into the image decoding device 21 is converted into decoded image data via an arithmetical decoding part 22, a bit modeling decoding part 23, reverse quantifying part 24, and a reverse wavelet transformation part 26, in that order.

Furthermore, an equation evaluation part 27 is installed in the image decoding device 21. In cases where numerical equation data is present in the compressed image file, this equation evaluation part 27 acquires this numerical equation data and performs an equation evaluation. The bit modeling decoding part 23 performs extraction and shift-down processing of the selected region in accordance with the results of this equation evaluation.

Transformation component are provided including the color transformation part 12 and wavelet transformation part 13, the dividing component including the equation evaluation part 19, numerical equation preparation part 18 and function of dividing the transformation coefficients into a selected region and non-selected region on the basis of numerical equation data of the bit modeling part 15, the encoding component including the bit modeling part 15, arithmetical encoding part 16, and bit stream production part 17.

Numerical component could also include numerical equation preparation component including the numerical equation preparation part 18 and the equation evaluation component of the equation evaluation part 19.

Decoding component could also be provided including the arithmetical decoding part 22 and bit modeling decoding part 23, the re-dividing component including the equation evaluation part 27 and the "function of dividing the decoded transformation coefficients into a selected region and non-selected region on the basis of numerical equation data" of the bit modeling decoding part 23, the adjustment component corresponds to the "function of shifting down the selected region and matching this with the bit expression of the non-selected region" of the bit modeling decoding part 23, and the reverse transformation component including the reverse wavelet transformation part 26.

The image encoding device includes the image encoding device 11, the imaging component of the imaging element 3, and image processing circuit 4.

Figure 3:
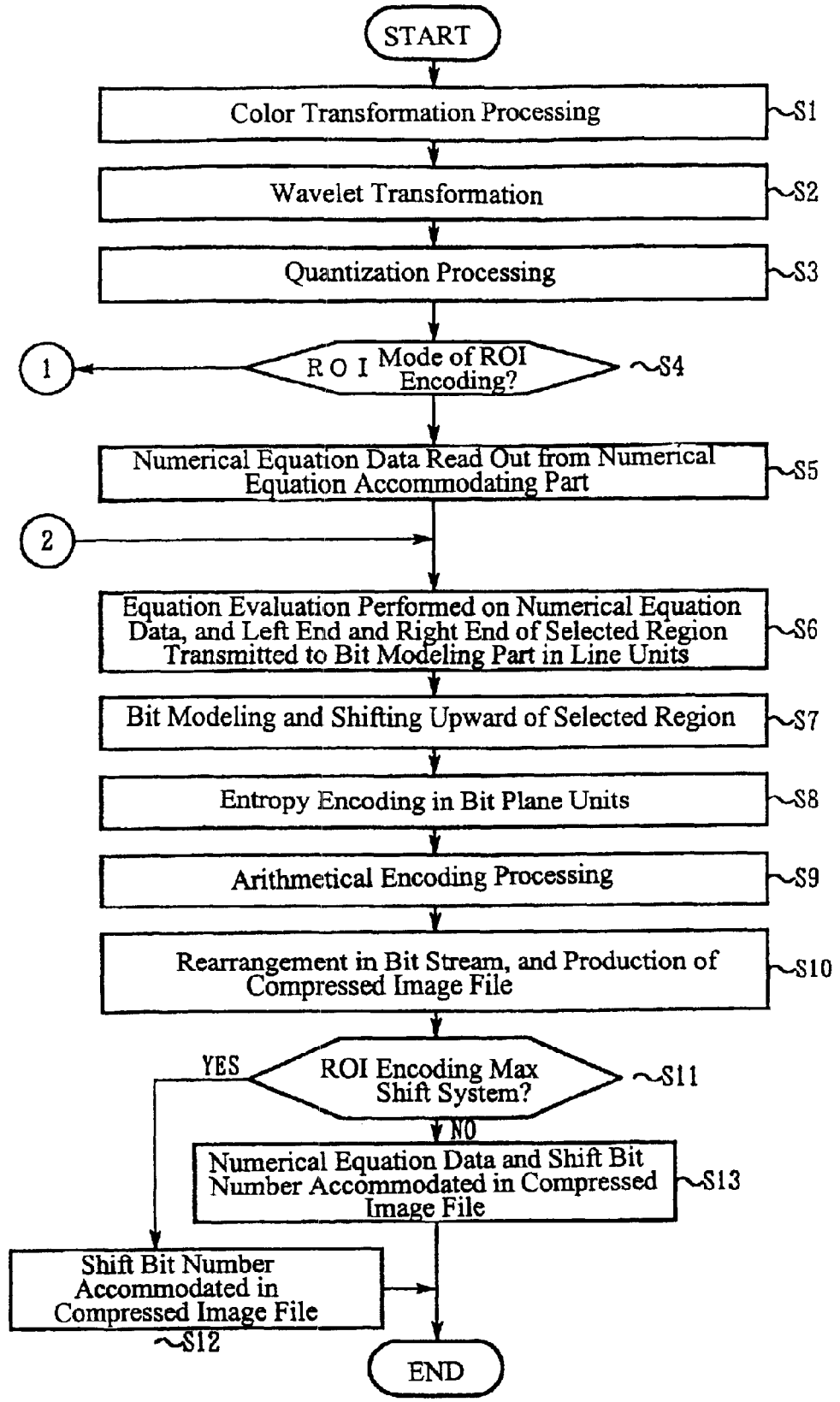
FIG. 3 is a flow chart (1/2) which illustrates the operation of the image encoding device 11.
Figure 4:
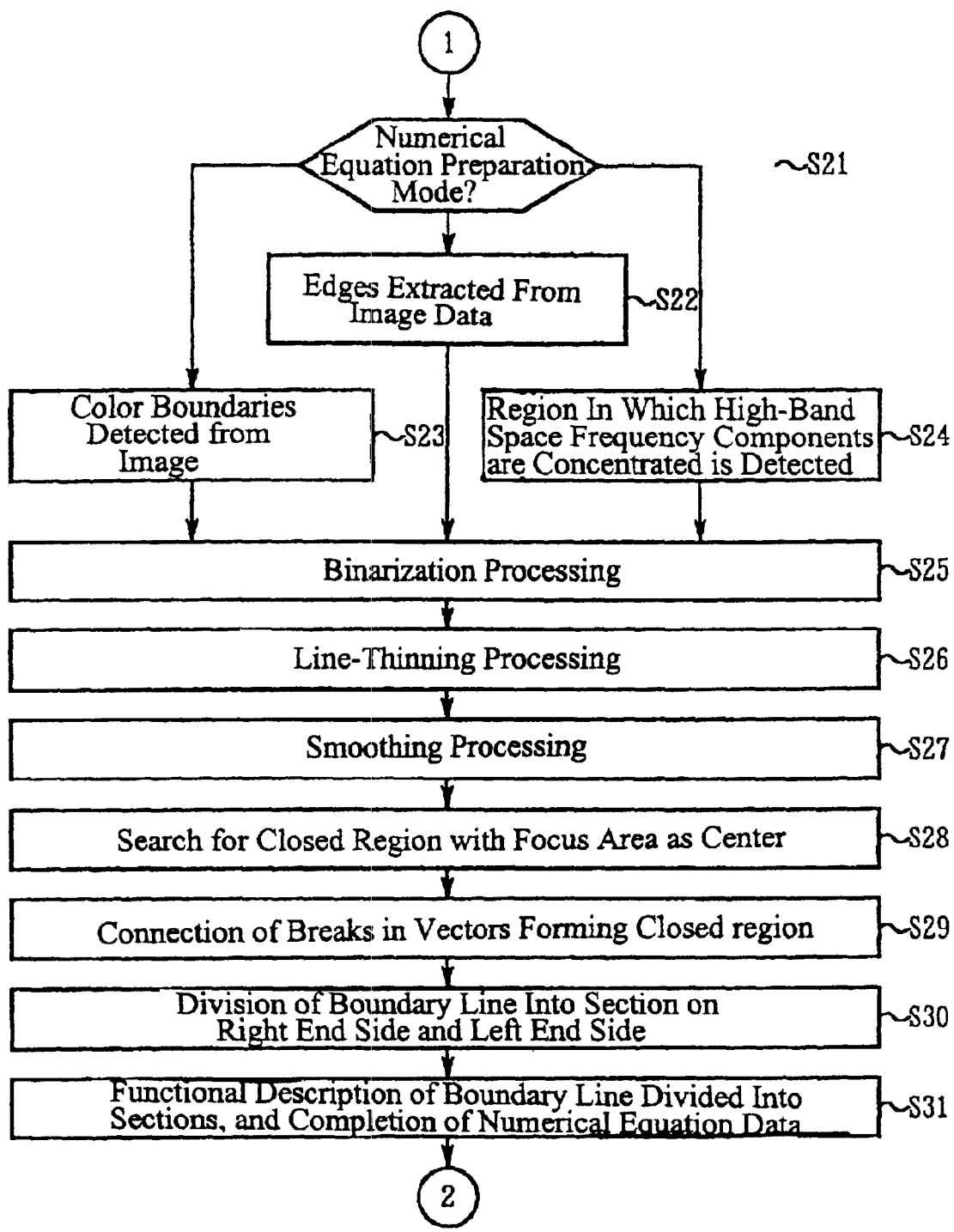
FIG. 4 is a continuation of the flow chart of FIG. 3 which illustrates the operation of the image encoding device 11.

FIGS. 3 and 4 are flow charts which illustrate the operation of the image encoding device 11. This operation is described according to the step numbers shown in FIG. 3.

Step S1: The color transformation part 12 performs a color coordinate transformation on the given image data as required, and converts this data into color components such as YCbCr.

Step S2: The wavelet transformation part 13 performs a sub-band decomposition by wavelet transformation on the image data output from the color transformation part 12, and thus converts the image data into transformation coefficients for each sub-band split region.

Step S3: The quantifying part 14 quantifies the transformation coefficients as required.

Step S4: The equation evaluation part 19 refers to user setting items stored in the internal memory (not shown in the figures) of the electronic camera 1, and discriminates the mode setting of ROI encoding. Here, in cases where the numerical equation preparation mode is selected, the equation evaluation part 19 shifts the operation to step S21 shown in FIG. 4. On the other hand, in cases where the numerical equation selection mode is selected, the equation evaluation part 19 shifts the operation to step S5.

Step S5: The equation evaluation part 19 refers to the user setting items of the electronic camera 1, and reads out numerical equation data corresponding to the shape of the selected region designated by the user from the numerical equation accommodating part 20.

Step S6: The equation evaluation part 19 performs an equation evaluation of the numerical equation data in line units of the sub-band images, and transmits the right end and left end of the selected region to the bit modeling part 15 in line units.

Typical numerical equation data will be concretely described below.

(A) In the Case of a Circle with a Center of (a, b) and a Radius of r

Line y present in the selected region: $b-r \leq y \leq b+r$

Left end Xleft in line y: $Xleft = a - \sqrt{r^2 - (y-b)^2}$

Right end Xright in line y: $Xright = a + \sqrt{r^2 - (y-b)^2}$ (B) In the Case of a Rectangle with an Upper Left Vertex (x1, y1) and a Lower Right Vertex (x2, y2)

Line y present in the selected region: $y1 \leq y \leq y2$

Left end Xleft in line y: $Xleft = x1$

Right end Xright in line y: $Xright = x2$ (C) In the case of an Ellipse with a Center of (a, b), a Radius of r1 in the Row Direction, and a Radius of r2 in the Column Direction Line y present in the selected region: $b-r2 \leq y \leq b+r2$ Left end Xleft in line y: $Xleft = a - r1 \times \sqrt{1 - (y-b)^2/r2^2}$ Right end Xright in line y: $Xright = a + r1 \times \sqrt{1 - (y-b)^2/r2^2}$ Step S7: After dividing the transformation coefficients into sign bits and absolute values, the bit modeling part 15 distributes the absolute values to a natural binary number of bit planes. Here, the bit modeling part 15 acquires the left end and right end of the selected region from the equation evaluation part 19 in line units.

Figure 5:
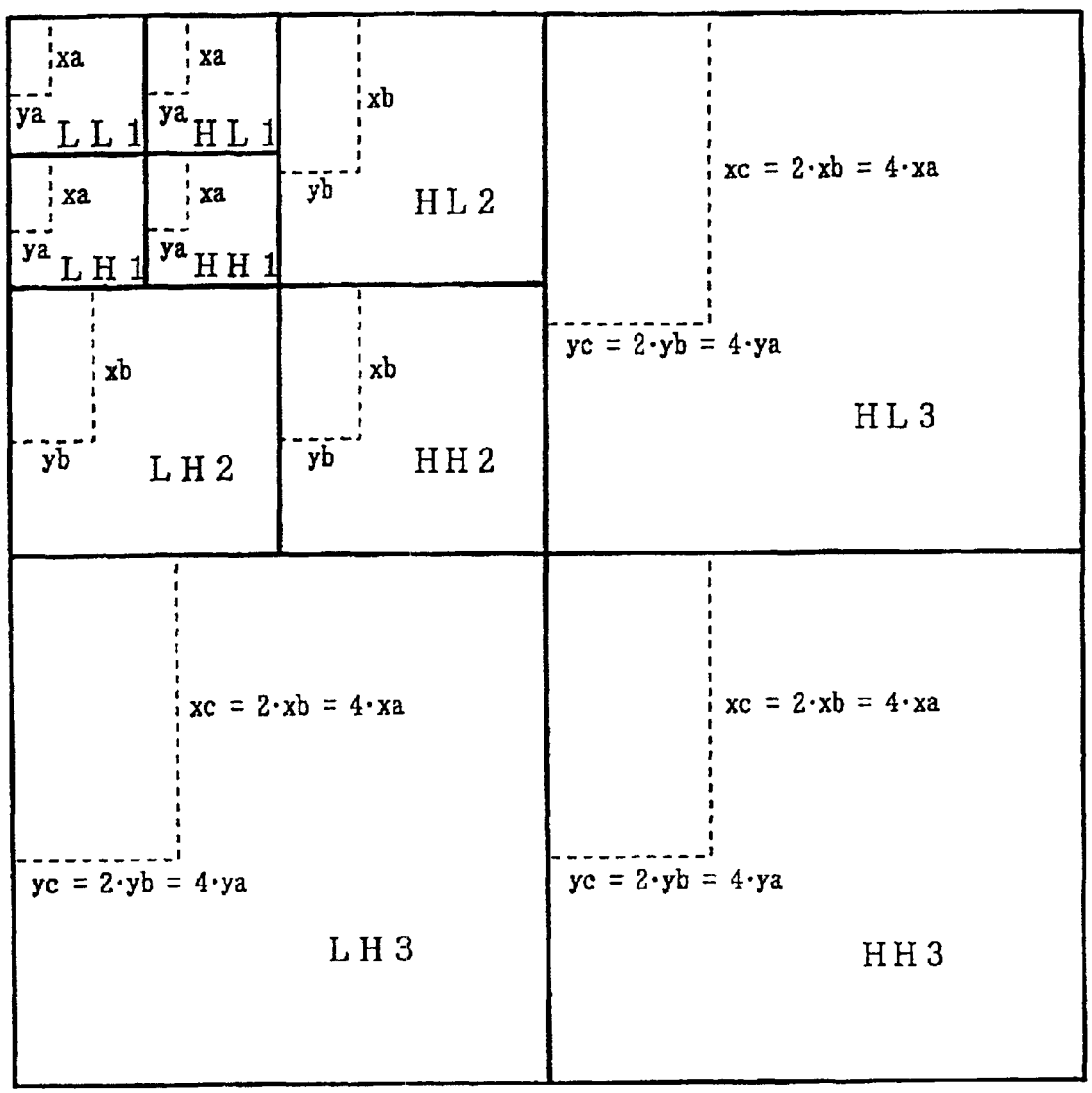
FIG. 5 is a diagram which shows the conditions of the coordinate transformation in respective sub-band split regions.

The bit modeling part 15 subjects this left end and right end to a coordinate transformation (reduction or enlargement) in accordance with the number of vertical and horizontal samples in each sub-band split region. FIG. 5 shows the conditions of the coordinate transformation for three points (xa, ya), (xb, yb) and (xc, yc) in each sub-band split region.

The bit modeling part 15 extracts transformation coefficients from the left end to the right end in line units in each sub-band split region, and shifts these transformation coefficients upward by the shift bit number of the ROI encoding.

Step S8: The bit modeling part 15 performs entropy encoding of the bit planes thus constructed via three types of encoding passes (significance pass, refinement pass and cleanup pass) in order from the upper bit plane. Furthermore, the sign bits are encoded immediately after the uppermost bits of the corresponding absolute values appear in the bit plane.

Step S9: The arithmetical encoding part 16 inputs the data for which the above-mentioned entropy encoding has been completed, and performs arithmetical encoding.

Step S10: The bit stream production part 17 rearranges the arithmetically encoded data according to four axes (importance of the bit plane, space resolution, block unit and color component), and realizes SNR progressive or space resolution progressive, etc.

For example, in the cage of SNR progressive, the bit stream production part 17 constructs a plurality of layers by classifying the data in the order of the contribution of the data to the improvement of the SNR. The bit stream production part 17 forms an SNR progressive bit stream by rearranging these layers in order from the top. The bit stream production part 17 completes a compressed image file (compressed by fixed-length compression) by cutting this bit stream using an appropriate file size.

Step S11: The bit stream production part 17 makes a judgement as to whether max shift type ROI encoding has been performed. Here, in the case of a max shift system, the bit stream production part 17 shifts the operation to step S12. On the other hand, in the case of a system other than the max shift system, the bit steam production part 17 shifts the operation to step S13.

Step S12: Since the encoding in this case is max shift type ROI encoding, the numerical equation data describing the selected region is not needed for decoding. Accordingly, the bit stream production part 17 accommodates only the shift bit number S in the header information of the compressed image file.

Step S13: Since the encoding in this case is ROI encoding other than max shift type ROI encoding, the numerical equation data describing the selected region is needed for decoding. Accordingly, the bit stream production part 17 acquires numerical equation data from the equation evaluation part 19 as character sequence data, and accommodates this numerical equation data in the header information of the compressed image file together with the shift bit number S.

A compressed image file is completed as a result of the above-mentioned series of operations. Next, the operation that is performed in cases where the numerical equation preparation mode is selected will be described in accordance with the step numbers shown in FIG. 4.

Step S21: The numerical equation preparation part 18 refers to the user setting items of the electronic camera 1, and discriminates the numerical equation preparation mode setting. Here, in cases where the edge detection mode has been set, the numerical equation preparation part 18 shifts the operation to step S22. Furthermore, in cases where the color boundary detection mode has been set, the numerical equation preparation part 18 shifts the operation to step S23. On the other hand, in cases where the space frequency detection mode has been set, the numerical equation preparation part 18 shifts the operation to step S24.

Step S22: The numerical equation preparation part 18 performs a local filter processing such as that of a Laplace operator on the image data, and produces a processed image from which the edge parts are extracted. Following the production of such a processed image, the numerical equation preparation part 18 shifts the operation to step S25.

Step S23: The numerical equation preparation part 18 compares the color components of the image data, and extracts the color boundaries, thus producing a processed image consisting of color boundaries. Following the production of such a processed image, the numerical equation preparation part 18 shifts the operation to step S25.

Step S24: The numerical equation preparation part 18 covers gaps by performing line-thickening processing on the high sub-band split regions in pixel units, thus reducing the region of concentrated high-band components to several regions. The numerical equation preparation part 18 performs a local filter processing such as that of a Laplace operator on this image, thus producing a processed image consisting of edge parts of regions of concentrated high-band components. Following the production of such a processed image, the numerical equation preparation part 18 shifts the operation to step S25.

Step S25: After converting the processed image produced in one of steps S22 through S24 into absolute values, the numerical equation preparation part 18 binarizes the image using an appropriate threshold value that takes noise resistance into consideration, thus producing a binarized image.

Step S26: The numerical equation preparation part 18 perform line-thinning processing on the binarized image, thus producing a boundary line thickness of "1."

Step S27: The numerical equation preparation part 18 performs smoothing processing on the binarized image. The concrete processing procedure of this smoothing processing will be described below with reference to FIGS. 6 and 7.

In FIG. 6A the numerical equation preparation part 18 detects the connections of points with a line width of 1 from the binarized image, and expresses the results in the memory using a chain code with eight directions (vertical, horizontal and diagonal). Furthermore, the numerical equation preparation part 18 searches for code that is continuous in one direction among the chain code, collects this continuous code and replaces the continuous code with a single vector code. The vectorization of the binarized image is completed as a result of such processing.

In FIG. 6B the numerical equation preparation part 18 determines the sum of the vector lengths of the continuous vector code. Here, in cases where the sum of the vector lengths is less then a specified value (e.g., 100), the continuous vector code is deleted. Short vector codes are eliminated by this processing.

In FIG. 6C the numerical equation preparation part 18 searches among the continuous vector code for locations where vectors with a length of 1 dot intersect, and synthesizes intersecting vectors. As a result of this processing, 1-dot indentations and projections in the lines are eliminated.

In FIG. 6D the numerical equation preparation part 18 searches among the continuous vector code for locations where the vector direction is reversed. In cases where the duplicated lengths of these reversed vectors are less than a specified value (e.g., 10), the numerical equation preparation part 18 synthesizes reversed vectors. Unnecessary whisker-form lines are eliminated by this processing.

Figure 7:
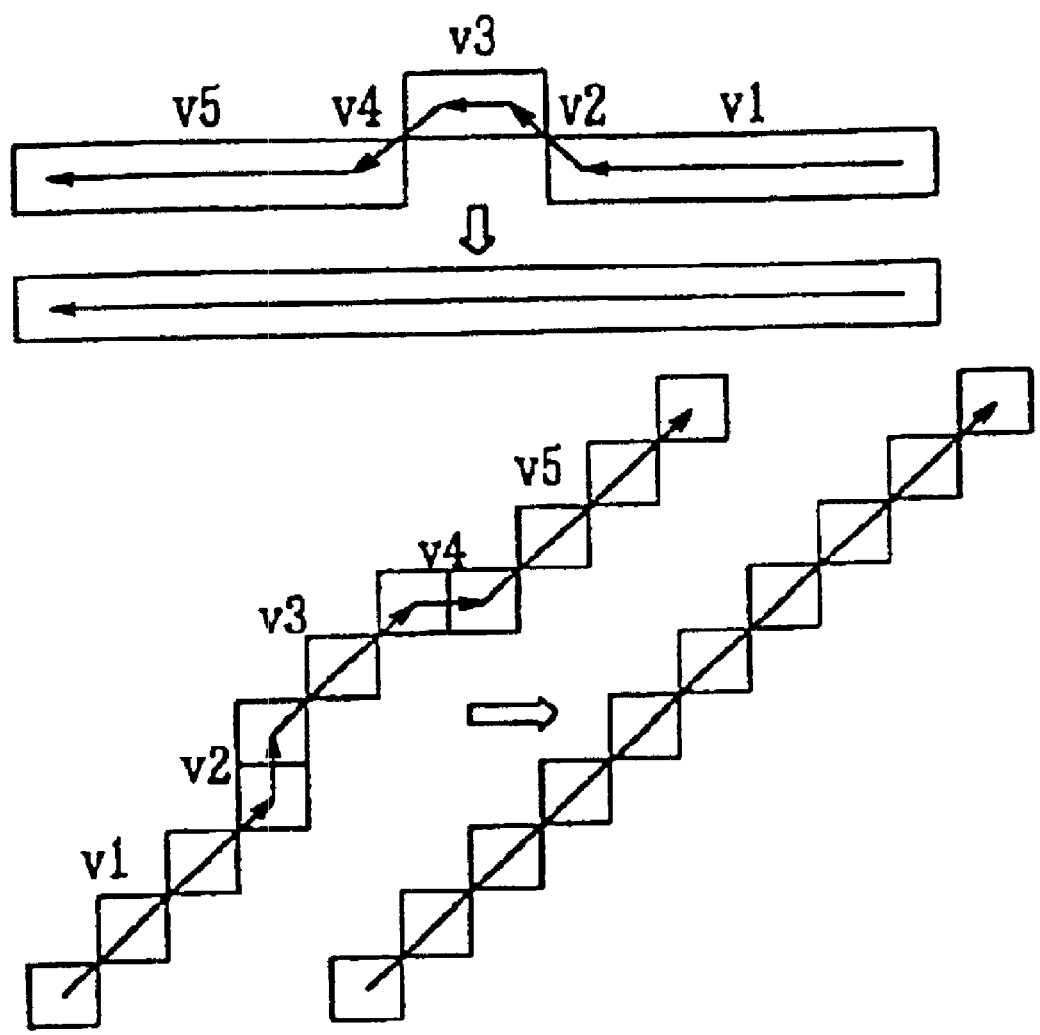
FIG. 7 is a continuation of the diagrams of FIGS. 6A–6D which illustrates the procedure of the smoothing processing.

In FIG. 7 the numerical equation preparation part 18 searches among the continuous vector code for vectors that are shifted parallel to each other by an interval of 1 dot (V3 in FIG. 7). The length of this vector V3 and the lengths of the parallel vectors (V1 and V5 in FIG. 7) are compared, and in a case where the length of the vector V3 is shorter, the vectors V1 and V5 are directly connected, and the intermediate vectors (V2, V3 and V4 in FIG. 7) are eliminated. As a result of this processing, rectilinear portions that are shifted in parallel by an interval of 1 dot can be shaped.

Furthermore, the smoothing processing of the binarized image can be performed even more strongly by repeating the above-mentioned processing a multiple number of times.

Step S28 (FIG. 4): The numerical equation preparation part 18 acquires positional information concerning the focus area used during imaging of the image data from the side of the electronic camera 1. The numerical equation preparation part 18 searches among the vector codes for vector codes centered on this focus area and directed toward the periphery. Following up the found vector codes in order, the numerical equation preparation part 18 searches for vector code groups that form closed regions. In the search for these closed regions, vector codes that approach each other within a specified interval are treated as connected vector codes.

Furthermore, in cases where the vector codes that are followed up cross the image frame above or below or to the left or right, the image frame is considered to be a part of the vector code.

Step S29: The numerical equation preparation part 18 connects cuts for vector code groups that can form closed regions.

Figure 8:
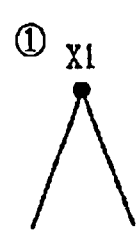
Figure 8:
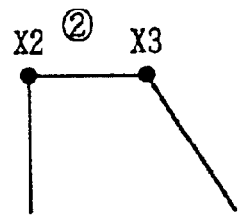
Figure 8:
Figure 8:
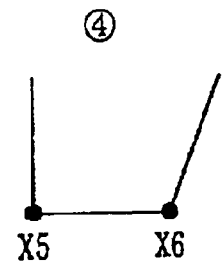
Figure 8:
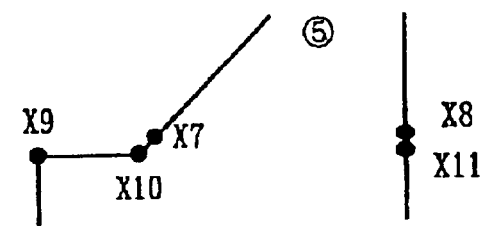
Figure 8:
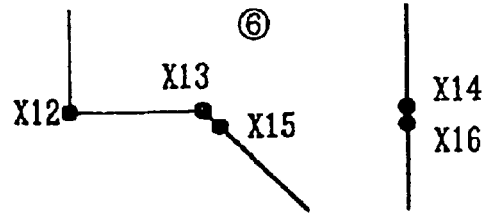
Figure 8:
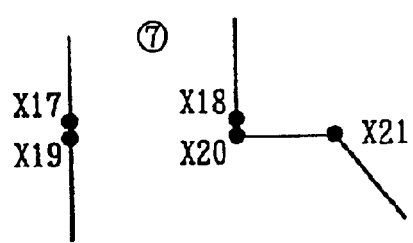
Figure 8:
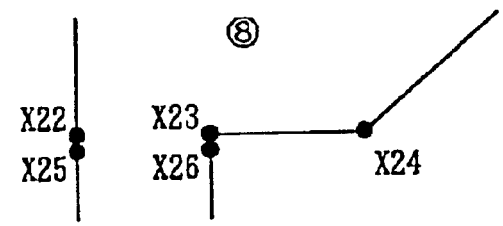
Figure 8:
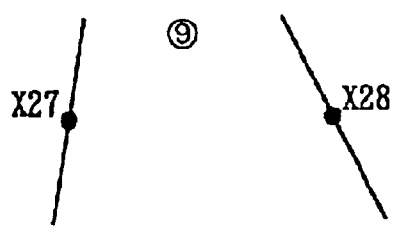

Step S30: The numerical equation preparation part 18 divides the boundary lines of the connected closed regions into sections on the left end side or right end side. FIG. 8 shows the section division rule for the boundaries of such closed regions. This section division rule will be described below with reference to FIG. 8.

As shown in FIG. 8-1, in cases where there is no boundary line in the top line, and the point X1 has appeared for the first time, this line is taken as the beginning line of a new selected region. Accordingly, the numerical equation preparation part 18 takes this location X1 as the starting point for the respective boundary lines on the left end side and right end side.

As shown in FIG. 8-2, in cases where there is no boundary line in the top line, and the left end X2 and right end X3 have appeared for the first time, this line is taken as the beginning line of a new selected region. Accordingly, the numerical equation preparation part 18 takes X2 as the starting point of the boundary line on the left end side, and X3 as the starting point of the boundary line on the right end side.

As FIG. 8-3 illustrates, in cases where there is no boundary line in the bottom lines and this line ends at point X4, this line is taken as the final line of the selected region. Accordingly, the numerical equation preparation part 18 takes this location X1 as the end points of the respective boundary lines on the left end side and right end side.

FIG. 8-4 shows cases where there is no boundary in the bottom line. This line ends at the left end X5 and right end X6, this line is taken as the final line of the selected region. Accordingly, the numerical equation preparation part 18 takes X5 as the end point of the boundary line on the left end side, and X6 as the end point of the boundary line on the right end side.

FIG. 8-5 illustrates cases where the boundary line on the left end side is shifted discontinuously to the left from the relay point X10 to the relay point X9, this is a point of discontinuity; consequently, it is desirable to divide the boundary line into sections. Accordingly, the numerical equation preparation part 18 takes the left end X7 one line above as the end point of the boundary line on the left end side, and the right end X8 on the same line as the left end X7 as the end point of the boundary line on the right end side. Furthermore, the numerical equation preparation part 18 takes the left end X9 as the starting point of a new boundary line on the left end side, and the right end X11 on the same line as the left end X9 as the starting point of a new boundary line on the right end side.

Figure 6:
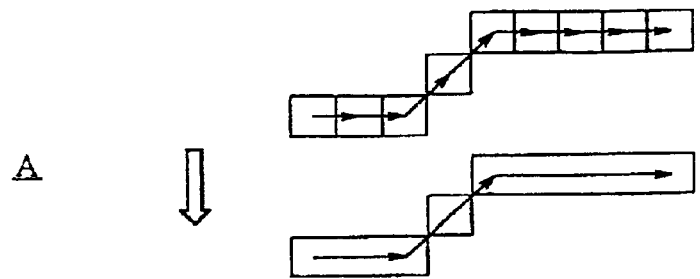
FIGS. 6A–6D are diagrams which illustrates the procedure of the smoothing processing.
Figure 6:
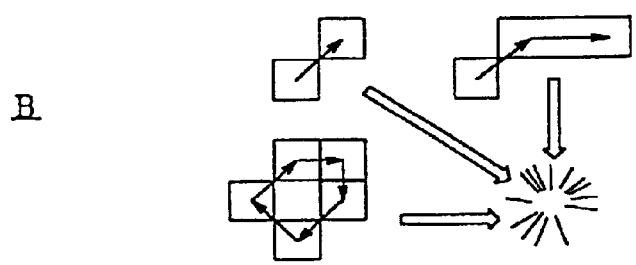
Figure 6:
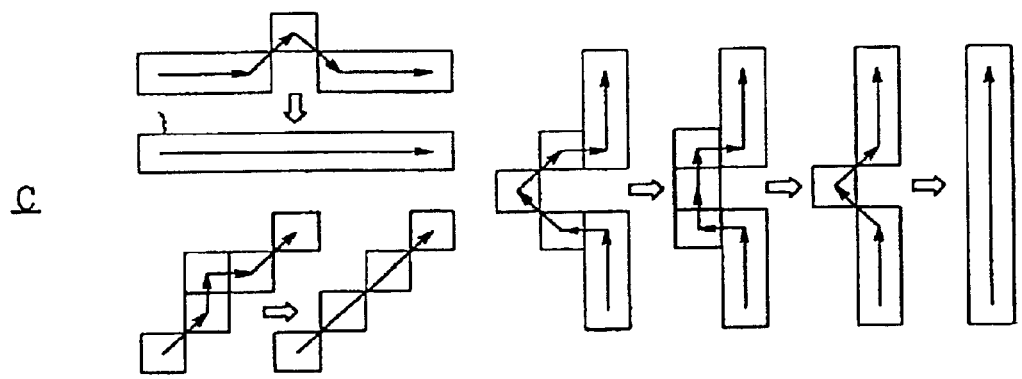
Figure 6:
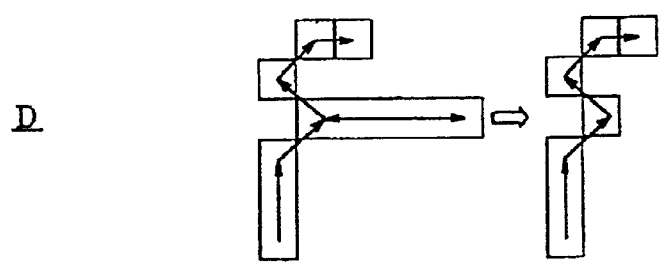

FIG. 8-6 shows cases where the boundary line on the left end side is shifted discontinuously to the right from the relay point X12 to the relay point X13, this is a point of discontinuity; consequently, it is desirable to divide the boundary line into sections. Accordingly, the numerical equation preparation part 18 takes the left end X12 as the end point of the boundary line on the left end side, and the right end X14 on the same line as the left end X12 as the end point of the boundary line on the right end side. Furthermore, the numerical equation preparation part 18 takes the left end X15 one line below as the starting point of a new boundary line on the left end side, and the right end X16 on the same line as the left end X15 as the starting point of a new boundary line on the right end side.

FIG. 8-7 illustrates cases where the boundary line on the right end side is shifted discontinuously to the right from the relay point X20 to the relay point X21, this is a point of discontinuity; consequently, it is desirable to divide the boundary line into sections. Accordingly, the numerical equation preparation part 18 takes the right end X18 one line above as the end point of the boundary line on the right end side, and the left end X17 on the same line as the right end X18 as the end point of the boundary line on the left end side. Furthermore, the numerical equation preparation part 18 takes the right end X21 as the starting point of a new boundary line on the right end side, and the left end X19 on the same line as the right end X21 as the starting point of a new boundary line on the left end side.

FIG. 8—8 shows cases where the boundary line on the right end side is shifted discontinuously to the left from the relay point X24 to the relay point X23, this is a point of discontinuity; consequently, it is desirable to divide the boundary line into sections. Accordingly, the numerical equation preparation part 18 takes the right end X24 as the end point of the boundary line on the right end side, and the left end X22 on the same line as the right end X24 as the end point of the boundary line on the left end side. Furthermore, the numerical equation preparation part 18 takes the right end X26 one line below as the starting point of a new boundary line on the right end side, and the left end X25 on the same line as the right end X26 as the starting point of a new boundary line on the right end side.

FIG. 8-9 demonstrates cases where the boundary lines on the left end and right end are connected with the line above as in the case of the relay points X27 and X28, the numerical equation preparation part 18 does not divide the boundary line into sections.

Figure 9A:
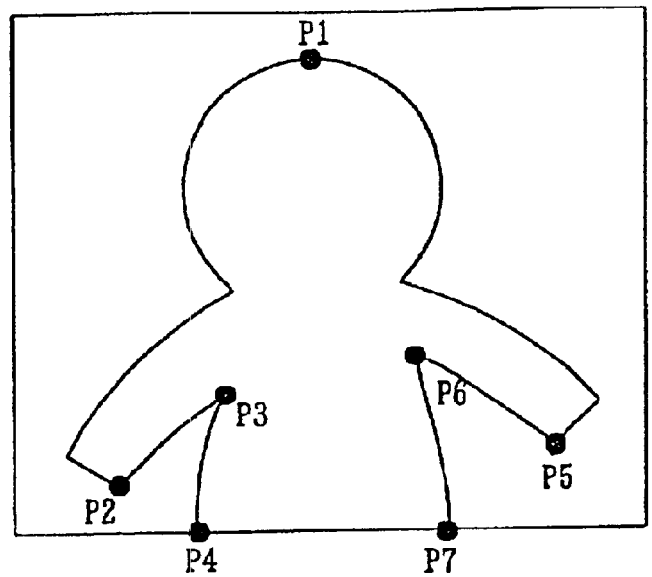
FIGS. 9A–9B are diagrams which illustrate the division of the boundary line into sections.
Figure 9B:
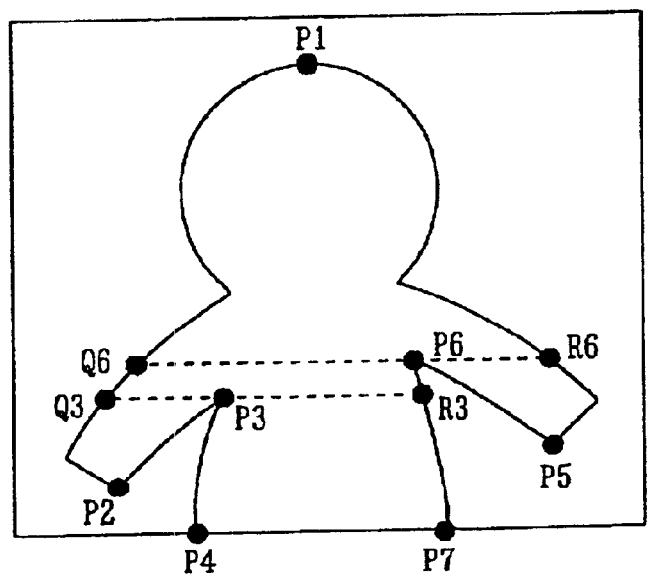

FIG. 9A is a diagram which shows one example of a boundary line divided into sections according to the above-mentioned rule. In cases where the closed region has indented parts as shown in FIG. 9A, three or more boundary lines are present within the same line. Accordingly, the numerical equation preparation part 18 successively judges pairs of these boundary lines from the left (or right) side, and adds section points (Q6, R6, Q3 and R3 shown in FIG. 9B) for the lines in which new pairs are generated.

Step S31 (FIG. 4): The numerical equation preparation part 18 approximates the boundary line divided into sections as described above using a function such as a broken line function, a Bezier function, a spline function or a multi-order function, and completes numerical equation data in which the left end side and right end side are paired. Furthermore, in this functional approximation, it is desirable that the boundary line be further divided into sections so that the precision of the approximation does not drop.

Following the completion of such numerical equation data, the numerical equation preparation part 18 returns the operation to the above-mentioned step S6. As a result, ROI encoding is performed on the basis of numerical equation data newly prepared in accordance with the image data.

Figure 10:
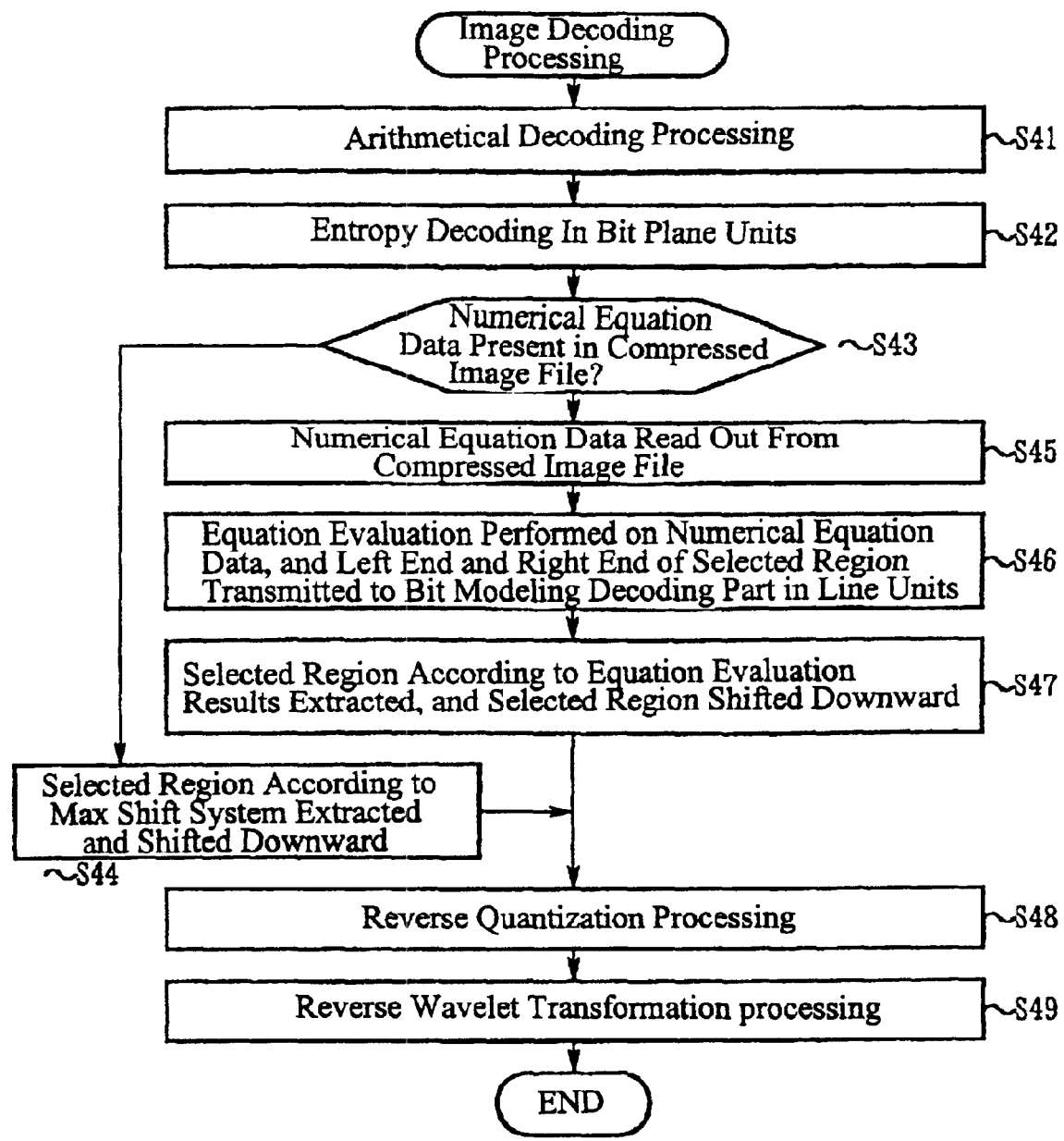
FIG. 10 is a flow chart which illustrates the operation of the image decoding device 21.

FIG. 10 is a flow chart which illustrates the operation of the image decoding device 21 in the present working configuration. The operation of the image decoding device 21 will be described according to the step numbers shown in FIG. 10.

Step S41: The arithmetical decoding part 22 performs arithmetical decoding of the given encoded data.

Step S42: The bit modeling decoding part 23 performs entropy decoding (with the bit planes as units) on the encoded data that has been arithmetically decoded, and thus determines the decoded transformation coefficients.

Step S43: The bit modeling decoding part 23 makes a judgement as to whether numerical equation data is present in the compressed image file. Here, in cases where numerical equation data is not present, the bit modeling decoding part 23 shifts the operation to step S44. On the other hand, in cases where numerical equation data is present, the bit modeling decoding part 23 shifts the operation to step S45.

Step S44: Since numerical equation data is not present, the bit modeling decoding part 23 judges that the encoding is ROI encoding based on the max shift method, and acquires the shift bit number S from the compressed image file. In the case of coefficients of planes higher than this shift bit number S, the bit modeling decoding part 23 judges that these coefficients are in the selected region of ROI encoding, and shifts the coefficients downward by the shift bit number S. After the bit expression of the selected region and non-selected region has been adjusted by such processing, the bit modeling decoding part 23 shifts the operation to step S48.

Step S45: The equation evaluation part 27 reads out the numerical equation data from the compressed image file.

Step S46: The equation evaluation part 27 performs an equation evaluation on the numerical equation data, and transmits the left end and right end of the selected region to the bit modeling decoding part 23 in line units.

Step S47: The bit modeling decoding part 23 extracts the selected region on the basis of the above-mentioned left end and right end, and shifts the bit planes (decoded transformation coefficients) of the selected region downward by the shift bit number S.

Step S48: The reverse quantifying part 24 performs reverse quantifying processing by multiplying the quantifying step size used during encoding by the decoded transformation coefficients. Furthermore, in cases where the quantifying step size used during encoding is "1," the reverse quantifying part 24 omits this reverse quantifying processing.

Step S49: The reverse wavelet transformation part 26 acquires the decoded transformation coefficients processed by the reverse quantifying part 24. The reverse wavelet transformation part 26 subjects these decoded transformation coefficients to a reverse wavelet transformation (sub-band synthesis), thus converting the coefficients into decoded image data. Decoded image data is completed as a result of the above-mentioned series of operations.

In the described present working configurations, the selected region is divided into sections using numerical equation data. The quantity of such numerical equation data does not vary even if the numbers of vertical and horizontal pixels of the data being handled increase. Accordingly, in the equation evaluation part 19, it is necessary only to handle equation data in which the quantity of data is substantially fixed, so that the implementation of an ROI processing system can be simplified compared to conventional examples in which a mask image in which the quantity of data varies is handled by buffering.

Furthermore, the quantity of data in such numerical equation data is extremely small compared to that in a mask image. Accordingly, the burden of data holding in the ROI processing system can be reduced compared to conventional examples in which a mask image is handled. Moreover, the burden of transmitting numerical equation data from the numerical equation accommodating part 20 to the equation evaluation part 19 can also be reduced.

Furthermore, the numerical equation data can be quickly applied to a plurality of sub-band split regions by performing a simple coordinate transformation.

Moreover, in the present working configuration, a main object of imaging with sharp edges can be found in an image, and a selected region can be appropriately set along the edges of this main object of imaging.

Furthermore, in the present working configuration, a main object of imaging with sharp color boundaries can be found in an image, and a selected region can be appropriately set along the color boundaries of this main object of imaging.

Moreover, in the present working configuration, a region with a specific space frequency distribution can be found, and a selected region can be appropriately set along the boundary line of this region.

Furthermore, in the present working configuration, the numerical equation data used during encoding is contained in the compressed image file. The quantity of this numerical equation data is generally smaller than the quantity of data in a mask image. Accordingly, compared to cases in which a mask image is contained in a compressed image file, the file capacity can be reduced to a considerable extent. Furthermore, by using the numerical equation data in the compressed image file during decoding, it is possible to perform the division into the selected region and non-selected region accurately under the same conditions as those existing during encoding.

Furthermore, in the above-mentioned working configurations, the judgement of the selected region is accomplished using equations that express the boundary lines on the left and right end. Accordingly, this method is advantageous in that the left end and right end of the selected region can be quickly determined in line units. However, the present invention is not limited to this. For example, it would also be possible to use inequality data that stipulates the boundaries of the selected region. In this case, the question of whether the transformation coefficients of pixel positions belong to the selected region can be determined by substituting the pixel positions into the inequality data, and performing an equation evaluation in order to determine whether inequality is established.

Furthermore, in the above-mentioned working configurations, a case was described in which the image encoding device 11 and image decoding device 21 were constructed in blocks by means of a plurality of processing parts. However, the present invention is not limited to this construction.

For, example, it would also be possible to prepare an image encoding program and image decoding program that are used to cause a computer to perform the operations of the respective processing parts described above (e.g., the flow charts shown in FIGS. 3, 4, and 10).

Furthermore, the working of the present invention regarding programs and recording media for such programs is not limited to the above-mentioned working configurations. For example, it would also be possible to distribute the programs via a communications circuit, and to record the programs in the system memories or hard disks, etc., of destination computers. By means of such program distribution, the program distribution source can manufacture programs and recording media for such programs in destination locations.

Furthermore, by means of such program distribution, the distribution source can transfer the programs and recording media for such programs to the destinations. Moreover, the fact that the programs can be distributed can be announced via such a communications circuit, and a service that provides information regarding the location where the programs are stored can be offered.

It will be apparent to those skilled in the art that various modifications and variations can be made in the image encoding device, image decoding device, electronic camera and recording medium of the present invention without departing from the spirit or scope of the invention. Thus, it is intended that the present invention cover the modifications and variations of this invention provided they come within the scope of the appended claims and their equivalents.

What is claimed is:

1. An image encoding device comprising:
   a transformation component which transforms given image data into transformation coefficients by subjecting this data to a frequency decomposition,
   a dividing component which divides the transformation coefficients produced by the transformation component into a selected region on the image and a non-selected region other than the selected region, and
   an encoding component which encodes the transformation coefficients by preferentially allocating a greater quantity of information to the selected region than to the non-selected region, wherein
   the dividing component performs an equation evaluation of numerical equation data that stipulates the boundary of the selected region, and determines whether the transformation coefficients belong to the selected region on the basis of the results of the equation evaluation.

2. The image encoding device of claim 1, wherein the dividing component comprises:
   a numerical equation preparation component which performs an edge detection for the image data, determines an outline on the basis of the results of this edge detection, and prepares numerical equation data that approximately expresses the outline, and
   an equation evaluation component which performs an equation evaluation of the numerical equation data prepared by the numerical equation preparation component, and which makes a judgement on the basis of the equation evaluation results as to whether the transformation coefficients belong to the selected region.

3. The image encoding device of claim 1, wherein the dividing component comprises:
   a numerical equation preparation component which performs a color boundary detection for the image data, determines an outline on the basis of the results of this color boundary detection, and prepares numerical equation data that approximately expresses the outline, and
   an equation evaluation component which performs an equation evaluation of the numerical equation data prepared by the numerical equation preparation component, and which makes a judgement on the basis of the equation evaluation results as to whether the transformation coefficients belong to the selected region.

4. The image encoding device of claim 1, wherein the dividing component comprises:
   a numerical equation preparation component which performs a space frequency component detection for the image data, determines an outline on the basis of the results of this space frequency component detection, and prepares numerical equation data that approximately expresses the outline, and
   an equation evaluation component which performs an equation evaluation of the numerical equation data prepared by the numerical equation preparation component, and which makes a judgement on the basis of the equation evaluation results as to whether the transformation coefficients belong to the selected region.

5. The image encoding device of claim 1, wherein the encoding component forms a compressed image file from the combined encoded transformation coefficients and the numerical equation data used by the dividing component.

6. An image decoding device which decodes the compressed image file compressed by the image encoding device of claim 5, wherein the image decoding device comprises:
   a decoding component which reads out the encoded transformation coefficients from the compressed image file and decodes these transformation coefficients,
   a re-dividing component which reads out the numerical equation data from the compressed image file, performs an equation evaluation, and makes a judgement on the basis of the results of this equation evaluation as to whether the transformation coefficients decoded by the decoding component belong to the selected region,
   an adjustment component which adjusts the form of expression of the transformation coefficients in the selected region and the form of expression of the transformation coefficients in the non-selected region in accordance with the division of the re-dividing component, and
   a reverse transformation component which performs a reverse transformation on the image data using the transformation coefficients whose forms of expression have been adjusted by the adjustment component as sub-band components.

7. An electronic camera comprising: an imaging component which produces image data by imaging an object of imaging and which sends the image data thus produced to an image encoding device, wherein the image encoding device comprises:
   a transformation component which transforms given image data into transformation coefficients by subjecting this data to a frequency decomposition,
   a dividing component which divides the transformation coefficients produced by the transformation component into a selected region on the image and a non-selected region other than the selected region, and
   an encoding component which encodes the transformation coefficients by preferentially allocating a greater quantity of information to the selected region than to the non-selected region, wherein
   the dividing component performs an equation evaluation of numerical equation data that stipulates the boundary of the selected region, and determines whether the transformation coefficients belong to the selected region on the basis of the results of the equation evaluation.

8. The electronic camera of claim 7, wherein the dividing component comprises:
   a numerical equation preparation component performs an edge detection for the image data, determines an outline on the basis of the results of this edge detection, and prepares numerical equation data that approximately expresses the outline, and
   an equation evaluation component which performs an equation evaluation of the numerical equation data prepared by the numerical equation preparation component, and which makes a judgement on the basis of the equation evaluation results as to whether the transformation coefficients belong to the selected region.

9. The electronic camera of claim 7, wherein the dividing component comprises:
- a numerical equation preparation component which performs a color boundary detection for the image data, determines an outline on the basis of the results of this color boundary detection, and prepares numerical equation data that approximately expresses the outline, and
- an equation evaluation component which performs an equation evaluation of the numerical equation data prepared by the numerical equation preparation component, and which makes a judgement on the basis of the equation evaluation results as to whether the transformation coefficients belong to the selected region.

10. The electronic camera of claim 7, wherein the dividing component comprises:
- a numerical equation preparation component which performs a space frequency component detection for the image data, determines an outline on the basis of the results of this space frequency component detection, and prepares numerical equation data that approximately expresses the outline, and
- an equation evaluation component which performs an equation evaluation of the numerical equation data prepared by the numerical equation preparation component, and which makes a judgement on the basis of the equation evaluation results as to whether the transformation coefficients belong to the selected region.

11. The electronic camera of claim 7, wherein the encoding component forms a compressed image file from the combined encoded transformation coefficients and numerical equation data used by the dividing component.

12. A machine-readable recording medium comprising:
an image encoding program, wherein the image encoding program causes a computer to function as:
- a transformation component which transforms given image data into transformation coefficients by subjecting this data to a frequency decomposition,
- a dividing component which divides the transformation coefficients produced by the transformation component into a selected region on the image and a non-selected region other than the selected region, and
- an encoding component which encodes the transformation coefficients by preferentially allocating a greater quantity of information to the selected region than to the non-selected region, wherein the dividing component performs an equation evaluation of numerical equation data that stipulates the boundary of the selected region, and determines whether the transformation coefficients belong to the selected region on the basis of the results of the equation evaluation.

13. The machine-readable recording medium of claim 12, wherein the dividing component comprises:
- a numerical equation preparation component which performs an edge detection for the image data, determines an outline on the basis of the results of this edge detection, and prepares numerical equation data that approximately expresses the outline, and
- an equation evaluation component which performs an equation evaluation of the numerical equation data prepared by the numerical equation preparation component, and which makes a judgement on the basis of the equation evaluation results as to whether the transformation coefficients belong to the selected region.

14. The machine-readable recording medium of claim 12, wherein the dividing component comprises:
- a numerical equation preparation component which performs a color boundary detection for the image data, determines an outline on the basis of the results of this color boundary detection, and prepares numerical equation data that approximately expresses the outline, and
- an equation evaluation component which performs an equation evaluation of the numerical equation data prepared by the numerical equation preparation component, and which makes a judgement on the basis of the equation evaluation results as to whether the transformation coefficients belong to the selected region.

15. The machine-readable recording medium of claim 12, wherein the dividing component comprises:
- a numerical equation preparation component which performs a space frequency component detection for the image data, determines an outline on the basis of the results of this space frequency component detection, and prepares numerical equation data that approximately expresses the outline, and
- an equation evaluation component which performs an equation evaluation of the numerical equation data prepared by the numerical equation preparation component, and which makes a judgement on the basis of the equation evaluation results as to whether the transformation coefficients belong to the selected region.

16. The machine-readable recording medium of claim 12, wherein the encoding component forms a compressed image file from the combined encoded transformation coefficients and numerical equation data used by the dividing component.

17. The machine-readable recording medium comprising:
an image decoding program, wherein the image decoding program causes a computer to function as:
- a decoding component which reads out the encoded transformation coefficients from the compressed image file compressed by the image encoding device of claim 5 and decodes these transformation coefficients,
- a re-dividing component which reads out the numerical equation data from the compressed image file compressed by the image encoding device of claim 5, performs an equation evaluation, and makes a judgement on the basis of the results of this equation evaluation as to whether the transformation coefficients decoded by the decoding component belong to the selected region,
- an adjustment component which adjusts the form of expression of the transformation coefficients in the selected region and the form of expression of the transformation coefficients in the non-selected region in accordance with the division of the re-dividing component, and
- a reverse transformation component which performs a reverse transformation on the image data using the transformation coefficients whose forms of expression have been adjusted by the adjustment component as sub-band components.

* * * * *